Feb. 21, 1933.  W. L. FICKEY  1,898,355
POWDERED MATERIAL RECEIVING, STORAGE, AND DELIVERY CONTAINER
Filed Aug. 11, 1930  2 Sheets-Sheet 1

Inventor
W. L. Fickey
By M. Talbert Dick
Attorney

Feb. 21, 1933. W. L. FICKEY 1,898,355
POWDERED MATERIAL RECEIVING, STORAGE, AND DELIVERY CONTAINER
Filed Aug. 11, 1930 2 Sheets-Sheet 2

Inventor
W. L. Fickey
By M. Talbert
Attorney

Patented Feb. 21, 1933

1,898,355

UNITED STATES PATENT OFFICE

WARD L. FICKEY, OF SIOUX CITY, IOWA

POWDERED MATERIAL RECEIVING, STORAGE, AND DELIVERY CONTAINER

Application filed August 11, 1930. Serial No. 474,587.

The principal object of my invention is to provide a container for powdered material such as pulverized coal, that will receive the material without waste, store the same until used, and will successfully deliver the same when it is desired to use it.

A further object of my invention is to provide a powdered material receiving, storage and delivery container that will uniformly deliver the powdered material without stoppages or flooding.

A still further object of this invention is to provide a powdered material receiving, storage and delivery container that is easily installed.

A still further object of this invention is to provide a powdered material receiving, storage and delivery container that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawings, in which:

Powdered fuel is being used to greater extents as time goes on and its high efficiency and desirability becomes better known. The result is that many small operators and users are turning to this method of producing heat and are purchasing comminuted fuel from central coal reduction plants or points. The chief difficulties however that they are encountering are the successful receiving, storage and delivery of the fuel when needed. The present practice is to purchase the fuel in paper bags and empty the fuel by hand into the hopper when needed. This is not only a very tiresome and dirty task but due to the lightness of the powdered material some of it escapes into the atmosphere and settles upon and fouls adjoining machinery and objects and is lost. When in the hopper it often cakes and causes serious stoppages in the uniform delivery of the same. I have overcome these disadvantages as will be appreciated, by providing a container that will successfully receive the material without loss, successfully store it until used, and will properly deliver the powdered fuel when needed without attention from the operator.

Figure 1:
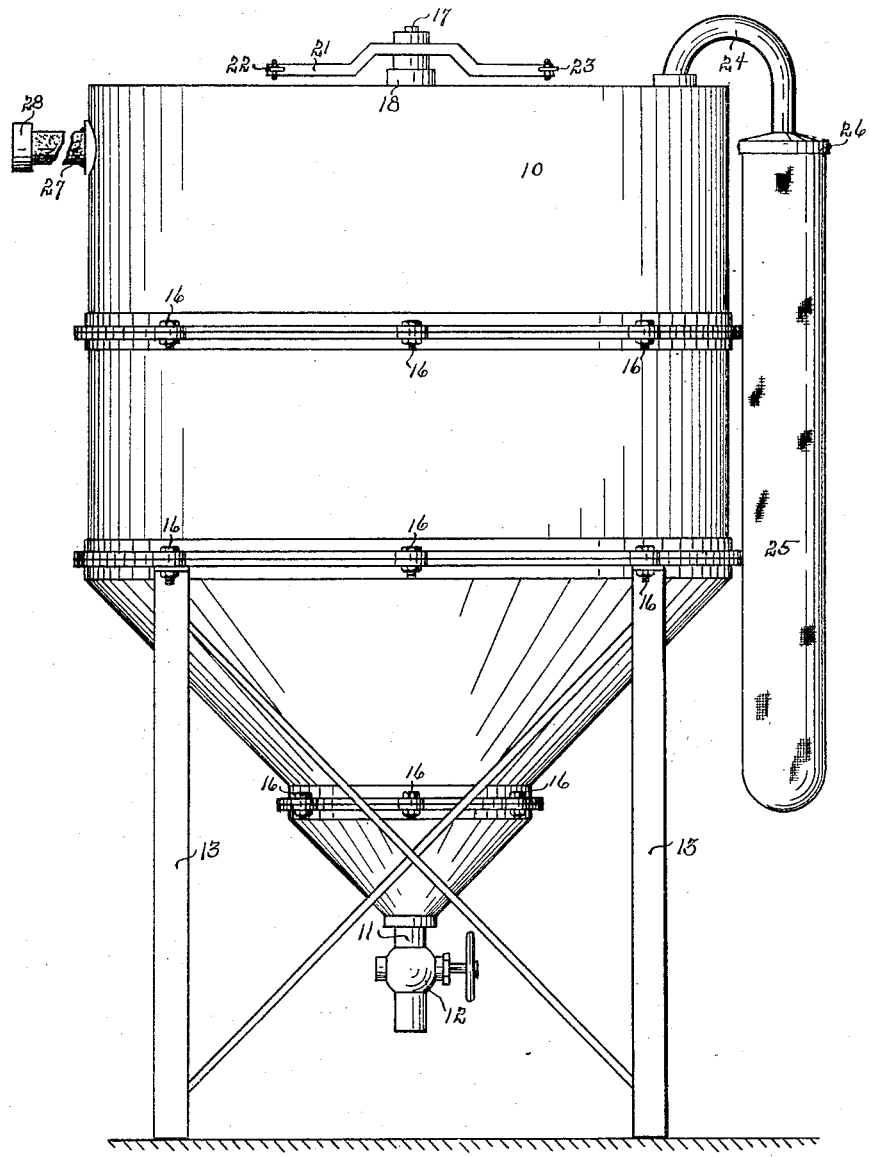
Fig. 1 is a side view of my complete invention ready for use.
Figure 2:
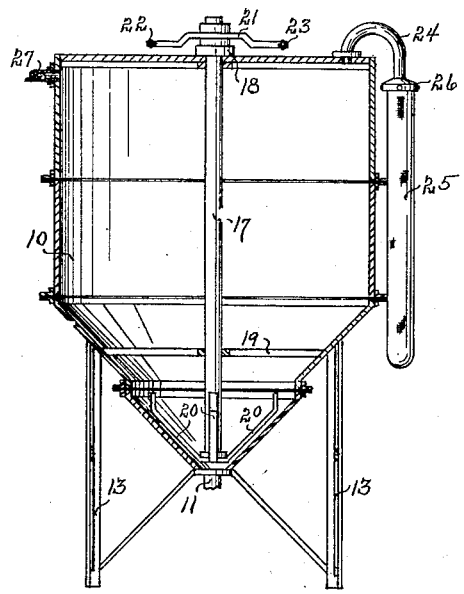
Fig. 2 is a side sectional view of my powdered material receiving, storage and delivery container and more fully illustrates its interior construction.
Figure 3:
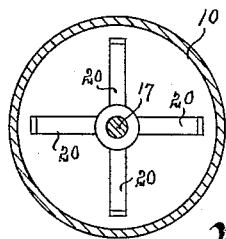
Fig. 3 is a top plan sectional view of the agitating means and is taken on line 3—3 of Fig. 2.
Figure 5:
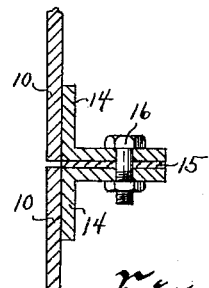
Fig. 5 is an enlarged sectional view of a portion of the container and illustrates the manner of securing the joints of the container together.

I have used the numeral 10 to designate my storage container having a downwardly and inwardly tapered bottom which terminates into the outlet pipe 11. This outlet pipe is designed to extend to the powdered fuel feeder or point of use of the powdered fuel. This pipe 11 may be closed or adjustably restricted by the manually operated valve 12. The numeral 13 designates legs for supporting the container 10. To all intents and purposes this container 10 is completely inclosed and may be made from a plurality of sections secured together by suitable means. By being made of a plurality of sections or parts the device may be easily transported, installed and set up at place of use which would not be the case if the device was too bulky for easy transportation or too large for entrance through the door of the room or building in which the container is to be installed. It also facilitates the manufacture and assembly of the invention at the factory and also permits the production of containers of various capacities merely by adding or reducing the number of sections or parts. In Fig. 5, I show one method of holding the various sections together, which consists of an L-flange 14 secured by solder or the like to the marginal edge of each of the sections. Between any two of these flanges is a gasket 15 and the flanges and gaskets are tightly clamped together by ordinary bolts 16. The numeral 17 designates a shaft extending longitudinally into the container from the top of the container and terminating near its bottom. This shaft is rotatably mounted in the container by being rotatably mounted in the bearing member 18, secured near the dead center top of the container and the spider member 19 secured in the bottom portion of the container as shown in Fig. 2. Secured on the bottom end of the shaft 17 are four agitating arms 20, evenly spaced apart one from the other and are preferably of spring rod steel.

Figure 4:
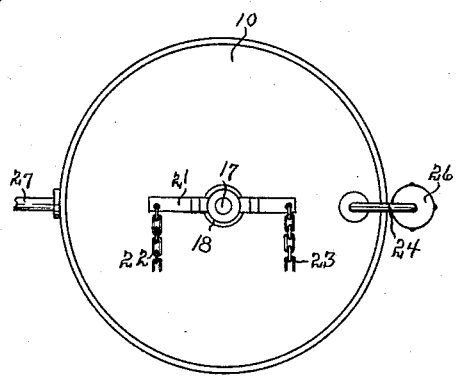
Fig. 4 is a top plan view of the invention and illustrates the manner of actuating the agitating means.

These agitating arms or rods each extend some distance adjacent the inner side of the tapered bottom of the container and then extend directly upwardly in the container. The numeral 21 designates a bar rigidly secured near its center to the upper end of the shaft 17, as shown in Fig. 4. Extending from the two end portions of this bar are the two chains 22 and 23, respectively the purpose of which will hereinafter be appreciated. The numeral 24 designates a curved pipe having one of its ends communicating with the top of the container 10 and its other end communicating with a fabric filtering bag or like 25. This filtering bag is detachably secured to the free end of the pipe 24 by an ordinary connection 26 and when the bag 25 is not in use it may easily be detached from the pipe 24 by the use of the connection 26 and a blank enclosure or plate substituted, if desired. The numeral 27 designates a pipe communicating with the inside top of the container 10. On the free end of this pipe 27 is a connection 28 capable of receiving a powdered fuel inlet pipe, not shown, which communicates with a supply of powdered fuel when it is desired to fill my container with the same.

The device or method used for filling such tanks as herein disclosed with powdered material is fully illustrated and explained in my co-pending application now filed in the United States Patent Office on a means for transporting and delivering powdered material and given Serial Number 471,253 on July 28, 1930, in which the powdered material is transported from a central point and injected into the local storage tank 10 by air pressure.

The successful operation of my invention is as follows:

The container 10 is filled with the powdered fuel by the powdered fuel being inserted through the member 27. As the powdered material passes into the container 10 some of it will naturally mix with the air inside the container. This material impregnated air will be displaced by the powdered material entering the container and as it is forced out of the container 10 to make room for the powdered fuel, it will pass through the air escape pipe 24 and into the fabric filtering bag 25. From the filtering bag the air will pass to the outside atmosphere but the powdered material will be retained inside the filtering bag due to the fact that its powdered particles will be too large to pass through the fabric with the air. By such a construction it will readily be seen that the container 10 may be easily filled with powdered material with great dispatch and without loss of the powdered material or fouling of surrounding property. The filtering bag 25 may be of either fabric or metallic mesh and the pipe 24 may be of sufficient length, if desired, for the bag to be located outside of the room in which the container 10 resides during the filling process. It is recommended however that the pipe 24 extend from the top of the container 10 and make a turn in its course as shown in the drawings, in order that as little as possible of the powdered material will pass into the same with the escaping air. After the container 10 has been supplied with powdered material the filtering bag may be removed from the pipe 24. if desired.

The container 10 is of tight construction and will successively store the powdered fuel until it is desired to use the same.

When it is desired to use any of the powdered material from the container the valve 12 should be open to permit the powdered material to run out of the bottom of the container. By the container 10 having a downwardly and inwardly extending bottom all of the powdered material will pass from the container and unless checked by the valve 12 or other suitable means such as when my invention communicates directly with the powdered fuel feeder hopper, as is well known to those familiar with the art.

To prevent the caking or arching of the powdered material in the container 10. I have provided the agitating means hereinbefore described. As is well known all small powdered fuel burners are automatic in that their operation is controlled by motor switches having actuating arms. These arms are primarily designed to open and close draft doors of the furnace when the burner is automatically ignited and goes on or off. The same actuating arms on these motor control switches are used to motivate the agitator in container. The chain 22 is designed to lead to one side of this motor switch and the chain 23 to the opposite side of the motor switch. By this arrangement, when the powdered fuel burner is automatically ignited and goes on, the motor switch will jerk the chain 22 which in turn will operate shaft 17. When the fuel burner is automatically shut down the opposite arm on the motor switch will jerk chain 23 moving shaft 17 in the opposite direction.

By moving the chains 22 or 23, the shaft 17 will be rotated, which will cause the agitator arms to stir the powdered fuel near the bottom of the container, thereby eliminating any caking or arching of the powdered fuel and cause the same to pass evenly and uniformly from the container.

If for any reason the powdered fuel should not feed properly from the container, thereby causing the powdered fuel burner to cease to burn, the motor switch would operate the chain 23 and rotate the shaft 27 which would actuate the agitator arms and cause the fuel, if it has become caked, to again properly pass through the pipe 11.

As all such powdered fuel burners are automatically ignited, the same would resume operation upon receiving powdered material from the container 10. By such a construction little attention by the operator of powdered fuel installations is necessary. The reason that the free ends of the agitator arms extend vertically into the container 10, is so that the same will successively engage the powdered material in the container.

The main portions however of these arms extend adjacent and parallel the extreme bottom of the container 10 to prevent any clogging or anchoring of the material at this point which is in close proximity to the outlet opening of the container. Besides opening and closing the pipe 11 the valve 12 may be used to regulate the amount of powdered fuel passing through the pipe 11.

Some changes may be made in the construction and arrangement of my improved powdered material receiving, storage and delivery container, without departing from the real spirit and purpose of my invention, and it is my intention to cover by my claim any modified forms of structure or use of mechanical equivalents which may be reasonably included within its scope.

I claim:

In a device of the class described, a powdered fuel container having straight sides and a downwardly tapered bottom terminating in an outlet opening, a shaft longitudinally rotatively mounted in said container and terminating adjacent said outlet opening, an air escape pipe having one end communicating with the inside top of said container, a fabric filtering bag inclosing the other end of said air escape pipe, a plurality of agitating arms secured to the lower end of said shaft; said arms each having their lengths extending first upwardly and outwardly parallel with said bottom of said container and then at a point a substantial distance from the highest elevation of said tapered bottom directly upwardly into the material in said container, a cross bar secured to the top of said shaft and located outside of said container, and a flexible member secured to each end of said cross bar for connecting said cross bar to suitable actuating mechanism.

WARD L. FICKEY.